(12) United States Patent
Vuksanović

(10) Patent No.: US 6,536,774 B1
(45) Date of Patent: Mar. 25, 2003

(54) MECHANICAL SEAL, IN PARTICULAR FOR PUMPS

(75) Inventor: Vladimir Vuksanović, Stockholm (SE)

(73) Assignee: Roplan AB, Tumba (SE)

( * ) Notice: Subject to any disclaimer, the term of this patent is extended or adjusted under 35 U.S.C. 154(b) by 0 days.

(21) Appl. No.: 09/674,650

(22) PCT Filed: May 4, 1999

(86) PCT No.: PCT/SE99/00748
§ 371 (c)(1),
(2), (4) Date: Jan. 30, 2001

(87) PCT Pub. No.: WO99/60290
PCT Pub. Date: Nov. 25, 1999

(30) Foreign Application Priority Data

May 4, 1998 (SE) .............................................. 9801557

(51) Int. Cl.$^7$ ................................................ F16J 15/38
(52) U.S. Cl. ....................................... 277/390; 277/396
(58) Field of Search ................................ 277/390, 391, 277/392, 393, 394, 395, 396, 397, 358, 366, 367, 368, 369, 370

(56) References Cited

U.S. PATENT DOCUMENTS

| | | | |
|---|---|---|---|
| 2,835,515 A | | 5/1958 | Solari |
| 3,718,336 A | * | 2/1973 | Jackson .................... 277/372 |
| 3,762,724 A | * | 10/1973 | Porter ....................... 277/353 |
| 4,342,538 A | * | 8/1982 | Wolford et al. ............. 415/231 |
| 5,040,804 A | * | 8/1991 | Back ........................... 277/558 |
| 5,112,039 A | * | 5/1992 | Walker ........................ 277/390 |
| 5,354,070 A | * | 10/1994 | Carmody ..................... 277/370 |
| 5,538,259 A | * | 7/1996 | Uhrner et al. ................ 277/370 |
| 5,716,054 A | * | 2/1998 | Duffee et al. ................ 277/374 |
| 5,727,792 A | * | 3/1998 | Rockwood .................... 277/364 |
| 6,210,107 B1 | * | 4/2001 | Volden et al. ............ 415/170.1 |

* cited by examiner

Primary Examiner—Anthony Knight
Assistant Examiner—Vishal Patel
(74) Attorney, Agent, or Firm—Swidler Berlin Shereff Friedman, LLP

(57) ABSTRACT

A seal device for sealing between a wall (3) and a shaft (5), especially in a pump, comprising a stationary, preferably ceramic, seal element (13), which is connected to the wall, and a movably, preferably ceramic, seal element (14) which is connected to the shaft and which seals against the stationary seal element. At least one of the seal elements is attached directly to a holding member (12), which is connected to the wall alternatively to the shaft. The seal element (13) of the holding member is provided with a circumferential surface (18), which, in the alternative in which the holding member is connected to the wall, extends in the hole (7) of the wall (3) in such a manner that an annular gap is formed between the wall and said circumferential surface. An elastic sealing ring (20) is provided in said gap for sealing between the wall and the seal element of the holding member. The seal device prevents that liquid is caught in cavities between the stationary seal element and the holding member, which am preferably connected to each other by shrinkage.

14 Claims, 5 Drawing Sheets

US 6,536,774 B1

MECHANICAL SEAL, IN PARTICULAR FOR PUMPS

THE BACKGROUND OF THE INVENTION AND PRIOR ART

The present invention refers to a seal device for sealing between a wall and a shaft, which extends through a hole in the wall, comprising an annular rotary symmetrical first seal element, which surrounds the shaft coaxially with the latter and which is connected to the wall, and an annular rotary symmetrical second seal element, which, is connected to the shaft coaxially with the latter. The seal elements are provided with respective annular seal surfaces, which extend in radial planes through the shaft and abut sealingly against each other, wherein at least one of the seal elements is attached directly to a holding member, which is connected to one of the wall and the shaft.

Such a seal device is used, inter alia, in pumps for high or low viscous liquids of different types, for example liquids of food, pharmaceuticals or the like, which liquids are sensitive to contamination. The seal elements are provided of a hard material, for example carbon or usually a ceramic, such as silicon carbide or hard metal. Such ceramic seal elements have a long lifetime and seals efficiently between the pump shaft and the pump housing, which contributes to a high reliability of pumps provided with said seal device. The long lifetime of the ceramic seal elements is of course due to the high resistance to wear of the ceramic material, but also to the fact that the liquid being pumped forms a thin lubricating film between the abutting seat surfaces of the seal elements.

However, it has been shown that it may arise hygienic problems in connection with pumping of certain liquids. Consequently, in connection with fastening of the annular seal element to the holding member which consists of a steel material, usually stainless steel, it is in practice impossible to avoid completely the emergence of cavities in the form of small openings and holes between the seal element and the holding member. Liquid residues may therefore in unfavourably cases be caught in said cavities and cause impermissible bacterial growth, which may result in contamination of the liquid, which is pumped.

As a solution to this hygienic problem it has previously been proposed that an annular rubber element is placed between the seal element and the holding member. The holding member may also be provided with drive pins, which extend into grooves in the seal element of the holding member. Certainly, such an annular rubber element seals efficiently between the seal element and the holding member, so that no cavities for liquid residues arise, but unfortunately gives rise to another problem. Consequently, it happens that pumps provided with seal devices of said type are used intermittently for the same kind of liquid without any intermediate washing, sterilisation or cleaning of the pumps which means that liquid, for example liquid food, during a period of rest of such a pump may get dry between the two seal elements abutting each other so that they get stuck to each other. This may result in cracking of the seal element in connection with the starting of the pump because it is brittle on the one hand and on the other hand resiliently connected to the holding member by means of said annular rubber element. Said drive pins may also cause cracks in the seal element.

SUMMARY OF THE INVENTION

The object of the present invention is to provide a seal device of the discussed type which remedies the above-described problems and which has a high reliability.

This object is achieved by a seal device of the initially described type which according to one aspect of the invention has the holding member connected to the wall and which is characterized in that the seal element of the holding member is provided with a circumferential surface, which extends in the hole of the wall so that an annular gap is formed between the wall and said circumferential surface, and that an elastic sealing ring is provided in said gap for sealing between the wall and the seal element of the holding member Said object is also achieved by a seal device of the initially described type which according to another aspect of the invention has the holding member connected to the shaft and which is characterized in that the seal element of the holding member is provided with a circumferential surface, which extends in an annular coaxial recess in the shaft, wherein the recess radially outwardly is delimited by an inner circumferential surface of the shaft so that an annular gap is formed between the shaft and the circumferential surface of said seal element, and that an elastic sealing ring is provided in said gap for sealing between the shaft and said seal element.

Hereby, the advantage is achieved that the seal element is rigidly attached directly to the holding member without the risk of liquid residues being caught in cavities between the seal element and the holding member because said sealing ring prevents liquid from reaching said cavities.

According to a preferred embodiment of the seal device according to the invention said circumferential surface of the seal element of the holding member continues axially to a circumferential surface of the holding member via a joint between said seal element and holding member. The elastic sealing ring extends to the circumferential surface of the holding member and covers said joint, whereby liquid is prevented from penetrating the joint. Moreover, the holding member is provided with an outer circumferential groove and the elastic sealing ring is provided with a radially inwardly extending portion, Which is provided in said circumferential groove, whereby the sealing ring is fixedly arranged in the intended position. Advantageously, the elastic sealing ring has a P-shaped cross-section, wherein the head of the P is provided in said circumferential groove.

Preferably the holding member is provided with a portion, which surrounds the seal element of the holding member and which axially extends a distance along the latter, wherein said seal element is attached to said portion of the holding member for example by gluing, hard soldering or shrinking of the holding member onto said seal element, Advantageously, the seal element of the holding member may be designed with a rectangular cross-section.

However, it is preferred that the seal element of the holding member has a substantially L-shaped cross-section, wherein one of the legs of the L extends axially and the other leg of the L extends radially. Said portion of the holding member is complementary to said L-shaped cross-section and extends inwardly on the upper side of said axial leg.

The object of the invention is also achieved by a seal device of the initially described type which according to a further aspect of the invention is characterized in that the seal element of the holding member is provided with a first portion, which is directly attached to the holding member and a second portion, which forms one of said annular sealing surfaces and which extends radially outwardly from the first portion, wherein an annular outwardly open groove is formed between the second portion of the seal element and the holding member, and that an elastic annular gasket is provided in said groove. The annular gasket guarantees that liquid may not penetrate possible cavities between the holding member and the first portion of the seal element.

Preferably, the first portion of the seal element of the holding member is annular and coaxial with the shaft, wherein the holding member surrounds said first portion, which means that the seal element may be attached to the holding member by a shrinkage process.

Advantageously, the holding member forms an axial shoulder against which the second portion of the seal element abuts, which automatically gives the desired width of the annular groove in connection with assembly of the seal element on the holding member so that the elastic gasket seals in the groove.

Suitably, the holding member and the second portion of the seal element are provided with respective annular surfaces, which extend in radial planes through the shaft, wherein said annular groove is delimited by said annular surfaces.

BRIEF DESCRIPTION OF THE DRAWINGS

The invention is described more closely in the following with reference to the enclosed drawings, in which.

In the figures identical components have been provided with the same reference signs.

Figure 1:
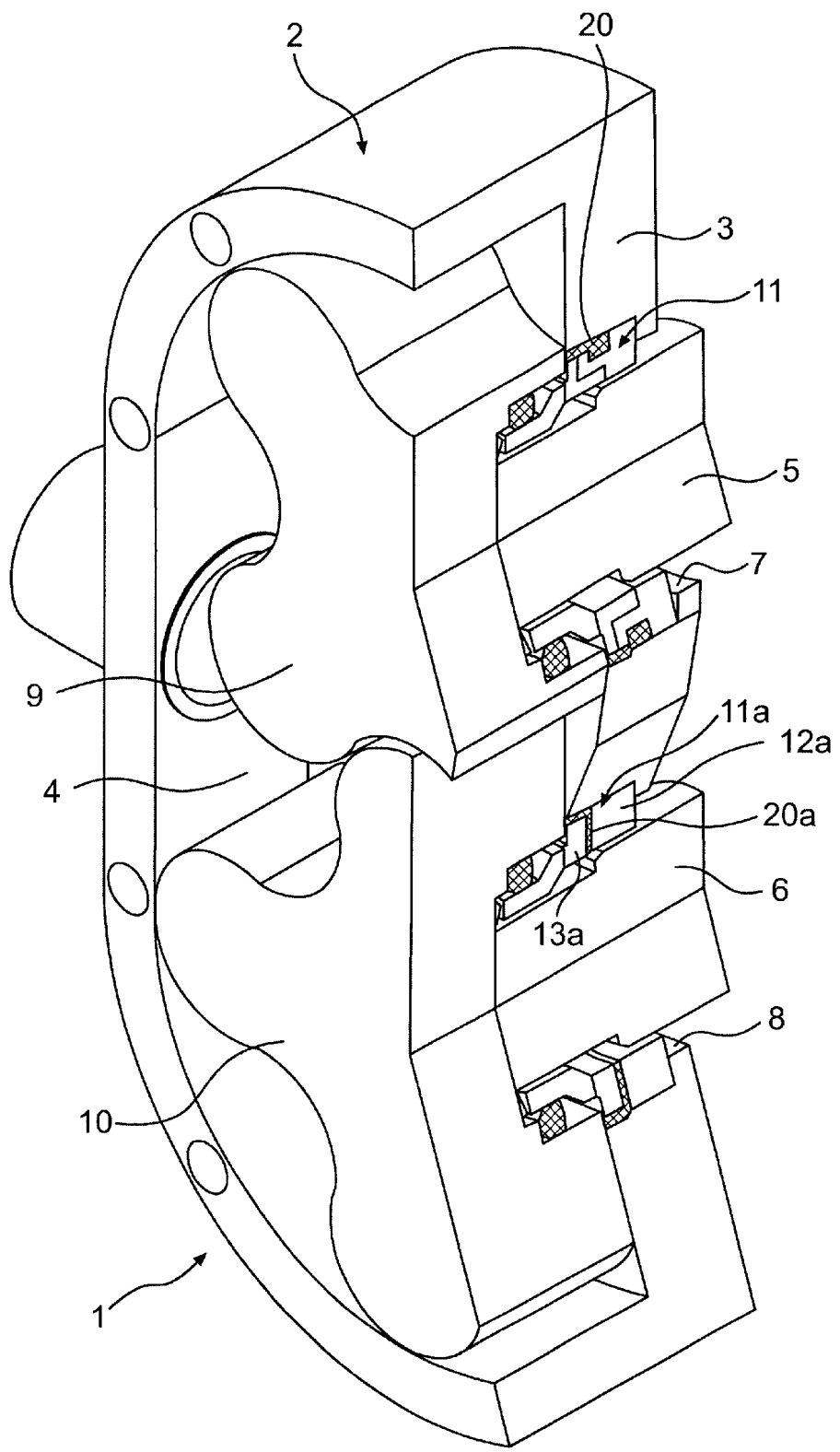
FIG. 1 shows a perspective sectional view of a rotary lobe pump with the end wall excluded, wherein the pump is provided with a previously known seal device at one pump shaft and a seal device according to a first embodiment of the invention at another pump shaft.

In FIG. 1 a rotary lobe pump 1 is shown which comprises a housing 2 with a wall 3, which forms a chamber 4, two parallel pump shafts 5 and 6, which extend through respective holes 7 and 8 in the wall 3 in the chamber 4, and two pump elements 9 and 10, which engage each other and which are attached to the respective pump shafts 5, 6 in the chamber 4. The pump shaft 5 is sealed off towards the wall 3 of the housing 2 by a seal device 11 according to the invention, which seal device 11 is more closely shown in FIG. 2, while the pump shaft 6, in illustrative purpose, is sealed off towards the wall 3 of the housing 2 by a known seal device 11a, which is described more closely below.

The seal device 11 has a stationary part, which comprises an annular rotary symmetrical holding member 12, which coaxially surrounds the pump shaft 5 in the hole 7 and is attached to the wall 3 by a not shown screw joint, and a stationary annular rotary symmetrical, preferably ceramic, seal element 13, which coaxially surrounds the pump shaft 5 and which is attached directly to the holding member 12. Moreover, the seal element 11 has a pump shaft part, which comprises a movable annular rotary symmetrical ceramic seal element 14, which is connected to the pump shaft 5 coaxially with the latter. The seal elements 13 and 14 are provided with respective flat annular seal surfaces 15 and 16, which extend in radial planes through the pump shaft 5 and abutting sealingly each other.

The seal element 13 has a substantially L-shaped cross-section, wherein one of the legs of the L extends axially and the other leg of the L extends radially The holding member 12 has a portion 17, which is complementary to said L-shaped cross-section of the seal element 13. The portion 17 extends inwardly on the upper side of the axial leg of the L-shaped cross-section of the seal element 13 and is attached to the seal element 13 by shrinkage or, alternatively, by gluing or hard soldering.

A circular cylindrical circumferential surface 18, which delimits the free end of the radial leg of the L-shaped cross-section of the seal element 13 and which extends in the hole 7 at a distance from the wall 3, is formed on the seal element 13 in such a manner that an annular gap is formed between the wall 3 and the circumferential surface 18. The circumferential surface 18 continues axially via a joint between the seal element 13 and the holding member 12 to a circular cylindrical circumferential surface 19 of the portion 17 of the holding member 12 with the same diameter as the circumferential surface 18. An elastic sealing ring 20 with a P-shaped cross-section abuts the circumferential surfaces 18 and 19 and has the head 21 of the P provided in a circular outer circumferential groove 22 on the holding member 12. The sealing ring 20 seals between the circumferential surfaces 18, 19 and the wall 3.

The stationary part of the known seal device 11a, which in FIG. 1 is provided between the wall 3 and the pump shaft 6, has a stationary ceramic seal element 13a, which is connected to a holding member 12a via a rubber element 20a, which is vulcanized to the seal element 13a and the holding member 12a.

The seal element 14 is axially displaceable on the pump shaft 5 towards the stationary seal element 13. A spring 23 presses towards the seal element 14 in such a manner that its seal surface 16 abuts the seal surface 15 of the seal element 13. A sealing ring 24 surrounds the seal element 14 and seals between the latter and the pump element 9.

During operation of the pump 1, the ceramic seal element 14 rotates together with the pump shaft 5 in such a manner that the seal surface 16 slides on the seal surface 15 of the stationary seal element 13 with a certain pressure, which is decided by the pressure of the liquid in the chamber 4. The liquid, which is pumped, may in certain applications penetrate between the seal surfaces 15 and 16 and hereby, form a thin lubricating liquid film between these. However, there is usually a special lubricating liquid under a higher pressure than the pumped liquid between the seal device 11 and a further pump shaft seal which special liquid forms said thin liquid film. The elastic sealing ring 20 of the seal device 11 according to the invention prevents that liquid penetrate cavities between the stationary ceramic seal element 13 and the holding member 12.

Figure 2:
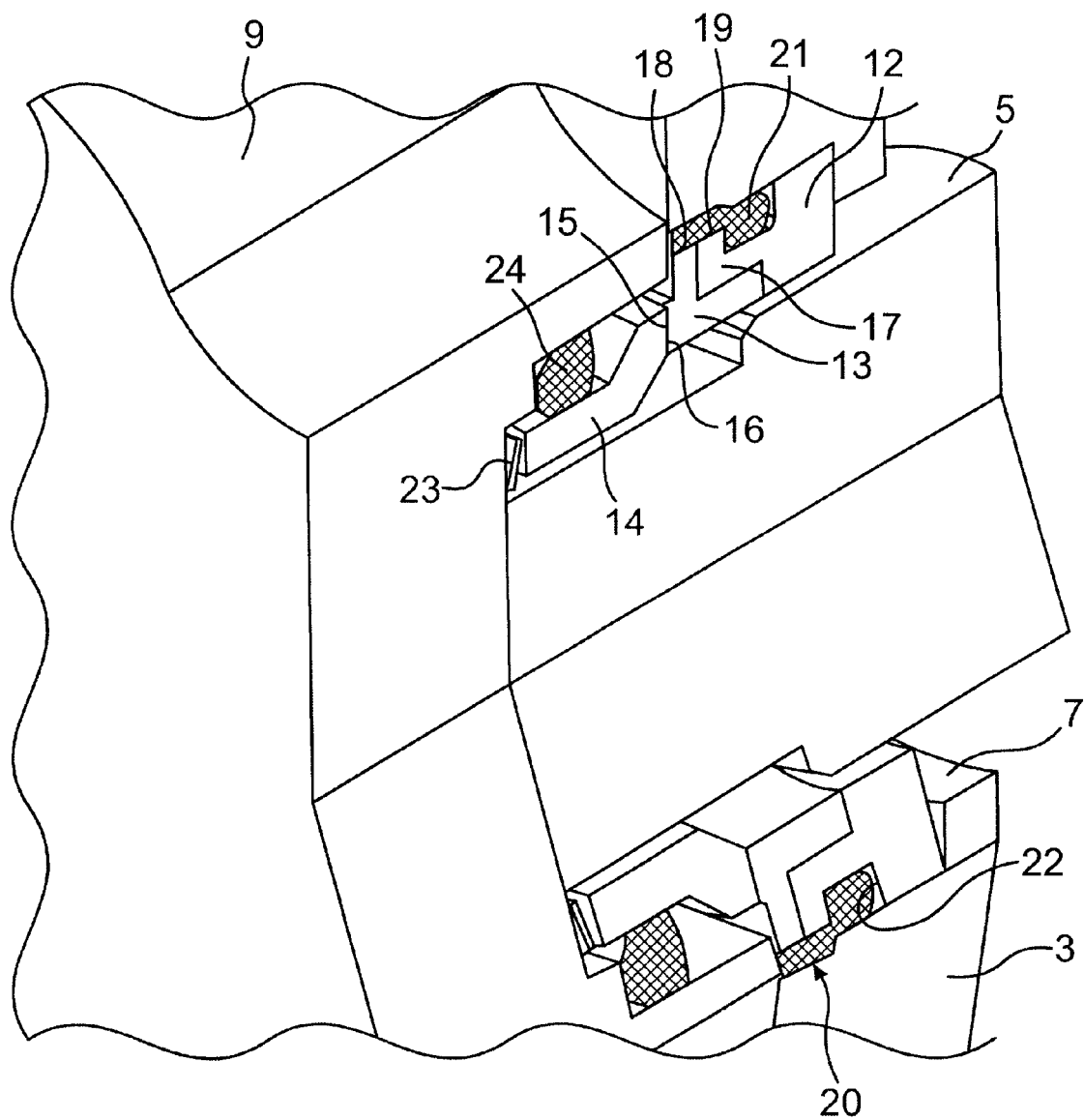
FIG. 2 shows an enlarged detail of the pump according to FIG. 1 including the seal device according to the invention.
Figure 3:
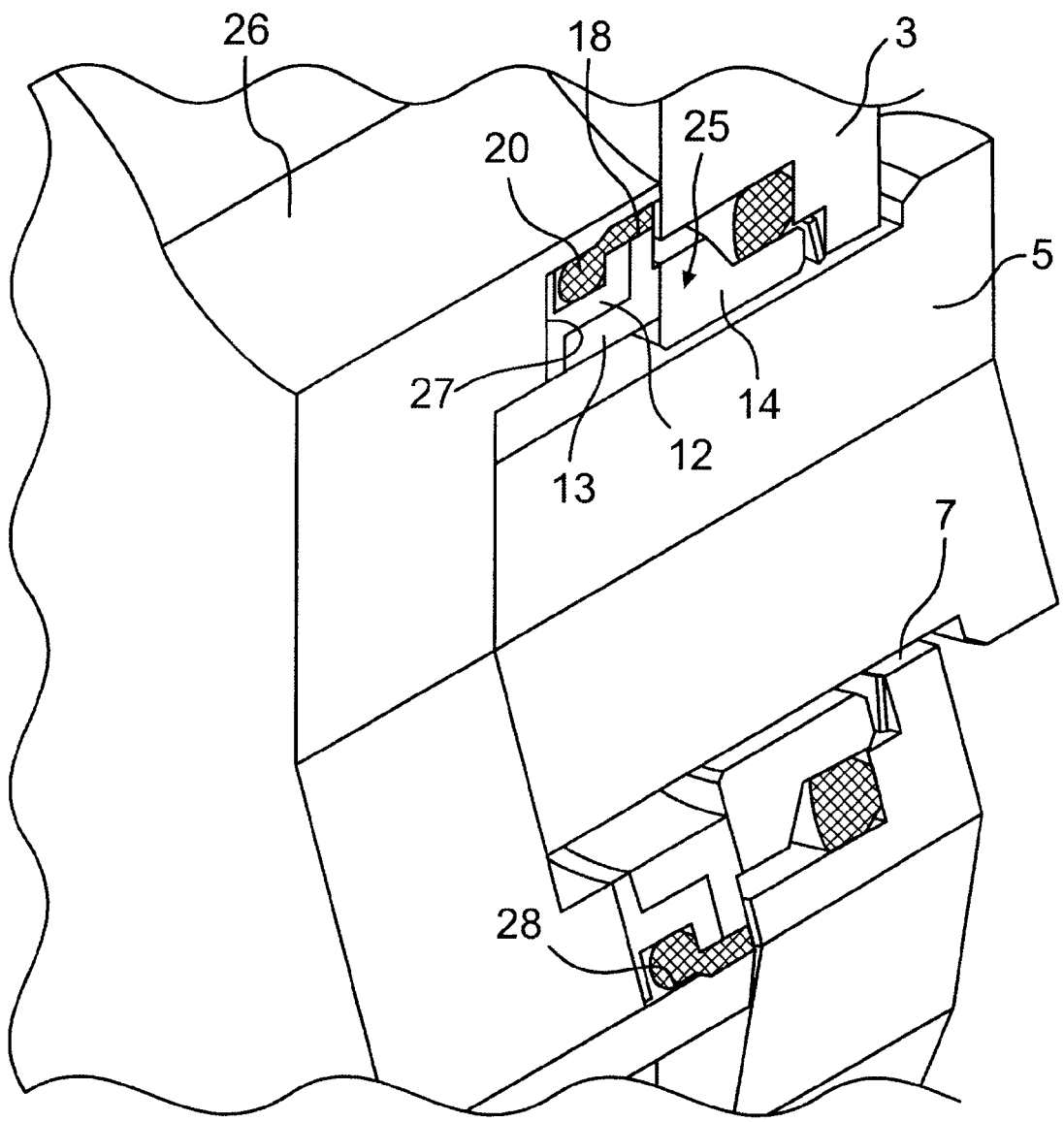
FIG. 3 shows the same detail as in FIG. 2 but with a second embodiment of the seal device according to the invention.

In FIG. 3 an alternative embodiment of the seal device 25 according to the invention is shown in which the seal element 13 with its holding member 12 is included in the pump shaft part of the seal device 25 and is attached to the pump shaft 5 by a not shown joint, for example a screw joint, while the seal element 14 is included in the stationary part and is connected to the wall 3 in the hole 7 analogous to the embodiment according to FIG. 2. A pump element 26 forms a portion of the pump shaft 5 and has an annular coaxial recess 27, which radially outwardly is delimited by an inner circumferential surface 28, The circumferential surface 18 of the seal element 13 extends in the recess 27 in such a manner that an annular gap is formed between the pump shaft 5 and the circumferential surface 18. The elastic sealing ring 20 is provided in this gap for sealing between the pump shaft 5 and the seal element 13.

Figure 4:
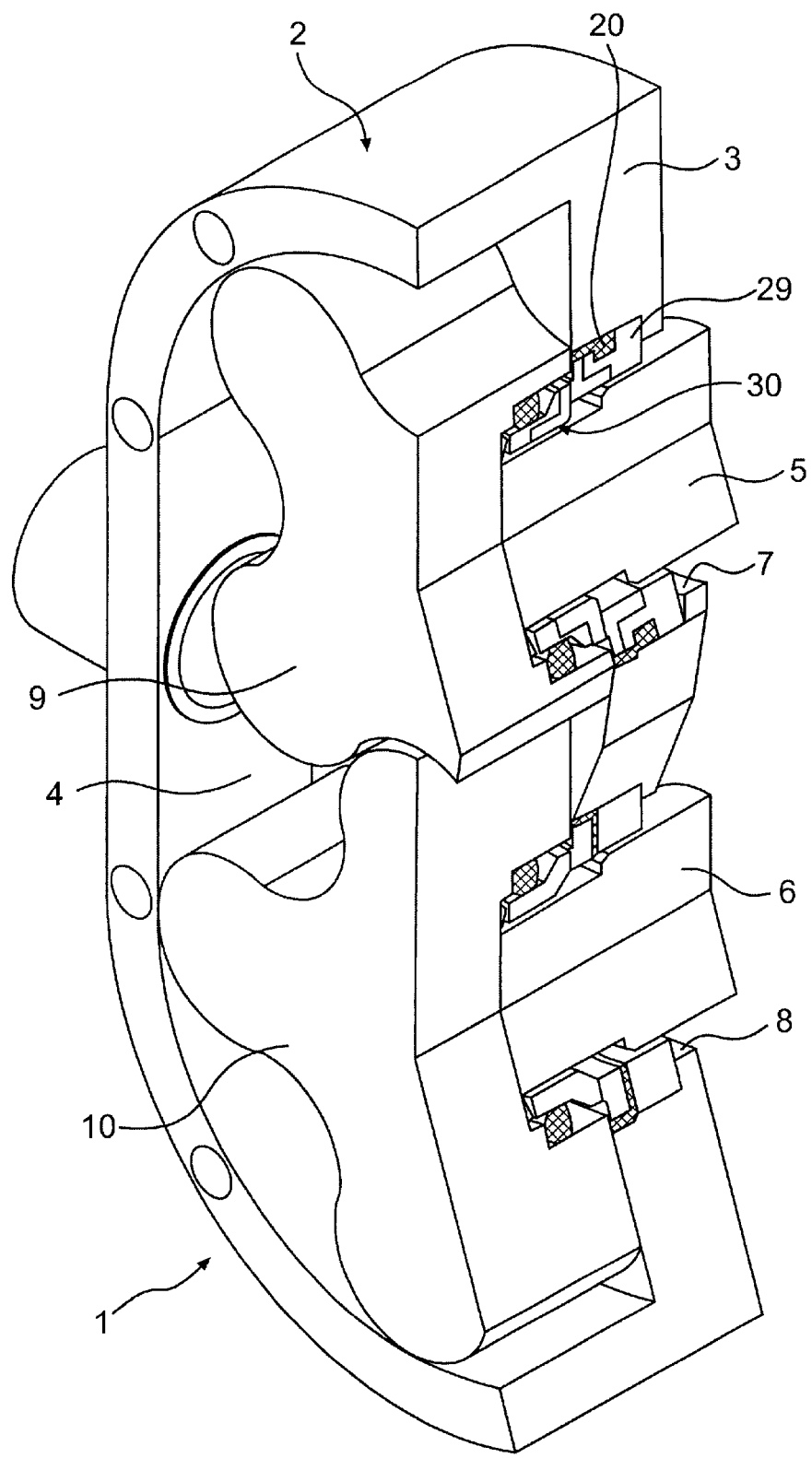
FIG. 4 shows the pump according to FIG. 1 with a third embodiment of the seal device according to the invention.
Figure 5:
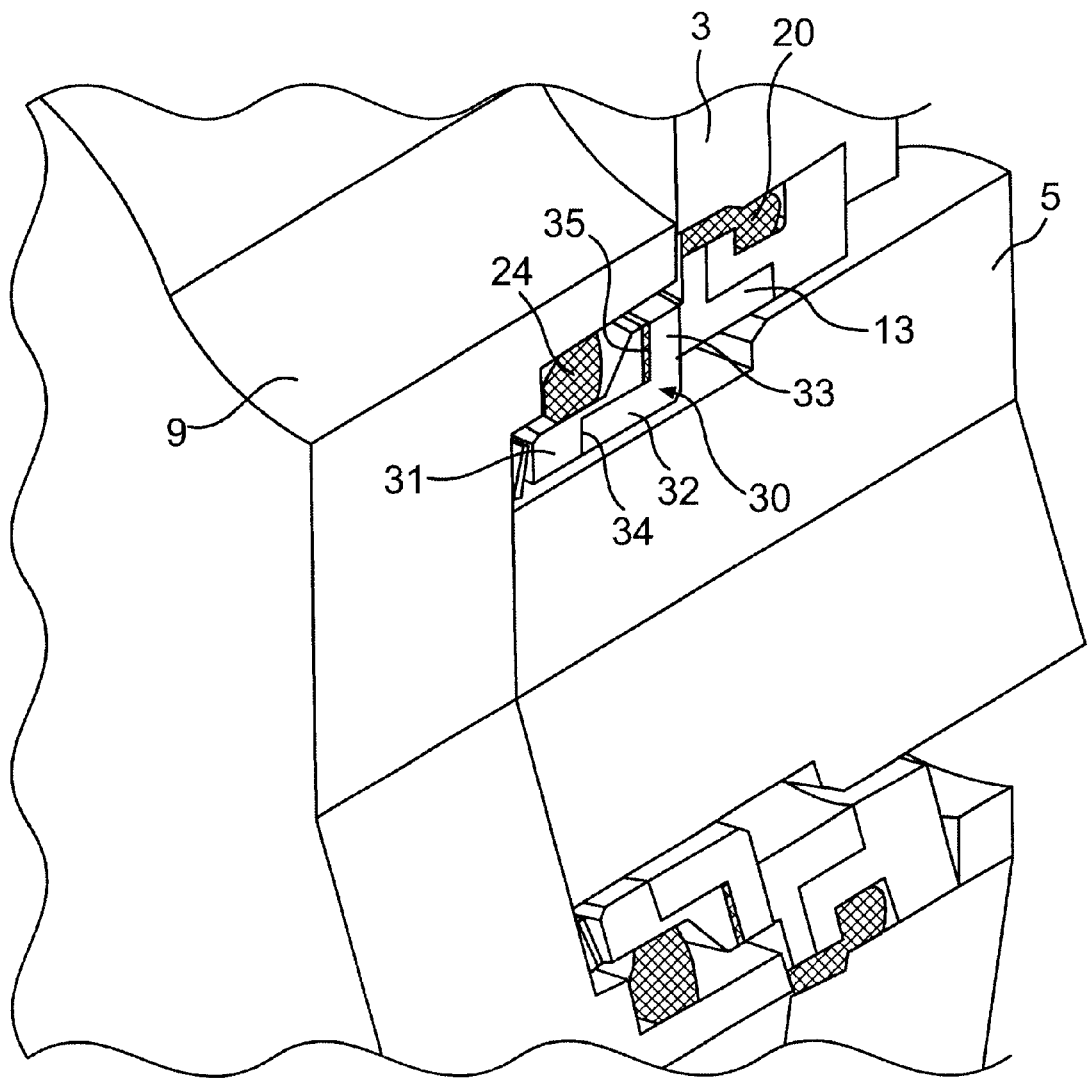
FIG. 5 shows an enlarged detail of the pump according to FIG. 4 and the seal device according to the invention.

In FIG. 4 the same rotary lobe pump as in FIG. 1 is shown with the exception of that one pump shaft 5 is provided with a seal device 29 according to a third embodiment of the invention. The seal device 29 is shown more closely in FIG. 5. Consequently, the pump shaft part of the seal device 29 has a seal element 30 with a L-shaped cross-section, which is attached directly to a holding member 31, which is connected with the pump shaft 5, while the stationary part has a stationary seal element 13, which is connected to the wall 3 in the same way as in the embodiment according to FIG. 2. The seal element 30 is provided with an annular portion 32, which is coaxially with the pump shaft 5 and which is surrounded by the holding member 31, and a radial portion 33, which extends radially outwardly from the annular portion 32. The portion 32 abuts an axial shoulder 34, which is formed by the holding member 31, and is attached to the holding member 31 by a shrinkage process. The holding member 31 and the radial portion 33 of the seal element 30 are provided with respective annular surfaces, which extend in radial planes through the pump shaft 5 and which delimit an annular groove. An elastic annular gasket 35 is provided in the annular groove and completely fills up the latter. A sealing ring 24 surrounds the holding member 31 and seals between the latter and the pump element 9 of the pump shaft 5.

Alternatively, the stationary part of the seal device 29 may be designed essentially as the pump shaft part of the seal device 29, i.e. may comprise corresponding components as the seal element 30, the holding member 31 and the gasket 35. Alternatively, the pump shaft part of the seal device 29 may also be replaced by one of the stationary part and the pump shaft part of the seal devices according to FIG. 2 or FIG. 3.

I claim:

1. A seal operable to seal between a shaft and a passage through a wall, the seal comprising:
    an annular radially symmetrical first seal comprising an annular seal surface extending in the plane passing through the shaft, the first seal comprising a circumferential surface that extends in the passage such that an annular gap is present between the wall and the circumferential surface, wherein the first seal surrounds and is coaxial with the shaft and connected to the wall, wherein the first seal has a substantially L-shaped cross-section comprising a first axially extending leg and a second radially extending leg, and wherein the surrounding portion of the holding member is complementary to the L-shaped cross-section and extends inwardly on an upper side of the second leg;
    an annular radially symmetrical second seal comprising an annular seal surface extending in a plane passing through the shaft, wherein the second seal surrounds and is coaxial with the shaft and is connected to the shaft, and wherein the annular seal surface of the second seal sealingly abuts the annular seal surface of the first seal;
    a holding member comprising a circumferential surface, wherein the holding member is connected to the wall, and wherein the holding member is attached to the first seal so as to form a joint, the holding member further comprising a portion that surrounds a portion of the first seal and axially extends a distance along the first seal, wherein the first seal is attached to the surrounding portion of the holding member; and
    an elastic sealing ring arranged in and operable to seal the gap between the circumferential surface of the first seal and the wall, wherein the elastic sealing ring extends over the circumferential surface of the first seal element and the circumferential surface of the holding member and the joint of between the holding member and the first seal.

2. The seal according to claim 1, wherein the circumferential surface of the first seal axially extends to the circumferential surface of the holding member.

3. The seal according to claim 1, wherein the holding member further comprises an outer circumferential groove and wherein the sealing ring further comprises a radially inwardly extending portion arranged in the groove.

4. The seal according to claim 3, wherein the sealing ring has a P-shaped cross-section comprising a head and a leg, wherein the head of the P is arranged in the circumferential groove.

5. The seal according to claim 3, wherein the first seal is attached to the holding member by shrinking, hard soldering or gluing the holding member onto the first seal.

6. A seal operable to seal between a shaft and a passage through a wall, the seal comprising:
    an annular radially symmetrical first seal comprising an annular seal surface extending in a plane passing through the shaft, wherein the first seal is coaxial with and surrounds the shaft, wherein the first seal is connected to the wall;
    an annular radially symmetrical second seal comprising an annular seal surface extending in the plane passing through the shaft, wherein the second seal is connected to and coaxial with the shaft, wherein the annular seal surface of the second seal sealingly abuts the annular seal surface of the first seal, the second seal further comprising a circumferential surface that extends in an annular coaxial recess of the shaft wherein the shaft recess is delimited by an inner circumferential surface of the shaft such that an annular gap is formed between the shaft and the circumferential surface of the second seal;
    a holding member comprising a circumferential surface, wherein the holding member is attached to the second seal so as to form a joint, the holding member further comprising an outer circumferential groove; and
    an elastic sealing ring arranged in and operable to seal the annular gap, wherein the sealing ring extends over the circumferential surface of the holding member and covers the joint, the sealing ring further comprising a radially inwardly extending portion arranged in the groove.

7. The seal according to claim 6, wherein the sealing ring has a P-shaped cross-section comprising a head and a leg, wherein the head of the P is arranged in the circumferential groove.

8. The seal according to claim 6, wherein the circumferential surface of the second seal axially extends to the circumferential surface of the holding member.

9. The seal according to claim 6, wherein the holding member further comprises a portion that surrounds a portion of the second seal and axially extends a distance along the second seal, wherein the second seal is attached to the surrounding portion of the holding member.

10. The seal according to claim 6, wherein the second seal is attached to the holding member by shrinking, hard soldering or gluing the holding member onto the second seal.

11. A seal operable to seal between a shaft and a passage through a wall, the seal comprising:

an annular radially symmetrical first seal comprising an annular seal surface extending in a plane passing through the shaft, wherein the first seal is coaxial with and surrounds the shaft, wherein the first seal is connected to the wall;

an annular radially symmetrical second seal comprising an annular seal surface extending in a plane passing through the shaft, wherein the second seal is connected to and coaxial with the shaft, wherein the annular seal surface of the second seal sealingly abuts the annular seal surface of the first seal, the second seal further comprising a circumferential surface that extends in an annular coaxial recess of the shaft wherein the shaft recess is delimited by an inner circumferential surface of the shaft such that an annular gap is formed between the shaft and the circumferential surface of the second seal, the second seal further comprising an L-shaped cross-section comprising a first axially extending leg and a second radially extending leg;

a holding member comprising a circumferential surface, wherein the holding member is attached to the second seal so as to form a joint, the holding member further comprising a portion that surrounds a portion of the second seal and axially extends a distance along the second seal, wherein the surrounding portion of the holding member is complementary to the L-shaped cross-section and extends inwardly on an upper side of the second leg, and wherein the second seal is attached to the surrounding portion of the holding member;

an elastic sealing ring arranged in and operable to seal the annular gap, wherein the sealing ring extends over the circumferential surface of the holding member and covers the joint.

12. A pump, comprising:

a housing including a wall that forms a chamber, the housing also including a hole in the wall;

at least one rotary pump shaft that extends through the hole in the wall of the housing;

a pump element fixedly connected to the pump shaft; and a seal according to claim 1 arranged between the wall of the housing and the shaft.

13. A pump, comprising:

a housing including a wall that forms a chamber, the housing also including a hole in the wall;

at least one rotary pump shaft that extends through the hole in the wall of the housing;

a pump element fixedly connected to the pump shaft; and a seal according to claim 6 arranged between the wall of the housing and the shaft.

14. A pump, comprising:

a housing including a wall that forms a chamber, the housing also including a hole in the wall;

at least one rotary pump shaft that extends through the hole in the wall of the housing;

a pump element fixedly connected to the pump shaft; and a seal according to claim 11 arranged between the wall of the housing and the shaft.

* * * * *